United States Patent
Sezgin et al.

(10) Patent No.: US 7,539,688 B2
(45) Date of Patent: May 26, 2009

(54) SYSTEMS AND METHODS FOR SUPPORTING INHERITANCE FOR USER-DEFINED TYPES

(75) Inventors: Beysim Sezgin, Redmond, WA (US); Denis Y. Altudov, Redmond, WA (US); Jose A. Blakeley, Bothell, WA (US); Ramachandran Venkatesh, Bellevue, WA (US); Wei Yu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/837,929

(22) Filed: May 3, 2004

(65) Prior Publication Data
US 2005/0177581 A1    Aug. 11, 2005

Related U.S. Application Data

(63) Continuation-in-part of application No. 10/775,282, filed on Feb. 10, 2004, now Pat. No. 6,976,029.

(51) Int. Cl.
*G06F 7/00* (2006.01)
*G06F 17/00* (2006.01)

(52) U.S. Cl. .......................... 707/100; 707/4; 717/106; 717/108

(58) Field of Classification Search ............... 707/1–10, 707/100–104.1, 200–206; 717/106, 108, 717/114, 122, 140, 148, 159
See application file for complete search history.

(56) References Cited

U.S. PATENT DOCUMENTS

| | | | |
|---|---|---|---|
| 5,297,279 A | | 3/1994 | Bannon et al. |
| 5,437,027 A | | 7/1995 | Bannon et al. |
| 5,682,532 A | * | 10/1997 | Remington et al. ......... 719/316 |
| 5,696,961 A | * | 12/1997 | Briscoe et al. ................. 707/2 |
| 5,699,518 A | * | 12/1997 | Held et al. ................... 709/229 |

(Continued)

FOREIGN PATENT DOCUMENTS

US    20020104068    *    8/2002    ................. 717/104

(Continued)

OTHER PUBLICATIONS

C.J. Harrison et al., Structure Editors: User-Defined Type Values and Type Inference, 2000, IEEE, 241-247.*

(Continued)

*Primary Examiner*—Jean B Fleurantin
(74) *Attorney, Agent, or Firm*—Woodcock Washburn LLP

(57) ABSTRACT

Various embodiments of the present invention are directed to a database with an extensible type system for at least one user-defined type that comprises information for describing its structure as well as information for describing an inheritance relationship between itself and another user-defined type (either a subtype or a supertype/base type). For certain embodiments, the user-defined type is defined in something other than Sequential Query Language (SQL) statement such as, for example, a Common Language Runtime (CLR) statement, a statement in C, C++, and C# ("C-sharp"), and/or a visual basic statement. In any event, several embodiments are further directed to a system wherein the database is aware of the inheritance relationship between two user-defined types by an explicit registration of the user-defined types with said database.

25 Claims, 6 Drawing Sheets

U.S. PATENT DOCUMENTS

| | | | | |
|---|---|---|---|---|
| 5,826,077 | A | * | 10/1998 | Blakeley et al. ................. 707/4 |
| 5,864,862 | A | * | 1/1999 | Kriens et al. ............ 707/103 R |
| 5,893,106 | A | | 4/1999 | Brobst et al. ................ 707/102 |
| 5,900,870 | A | | 5/1999 | Malone et al. .............. 345/333 |
| 6,032,152 | A | * | 2/2000 | Pearson .................. 707/103 R |
| 6,047,291 | A | | 4/2000 | Anderson et al. ........... 707/103 |
| 6,085,192 | A | | 7/2000 | Mendez et al. ................ 707/10 |
| 6,108,004 | A | | 8/2000 | Medl .......................... 345/346 |
| 6,112,024 | A | | 8/2000 | Almond et al. ............. 395/703 |
| 6,151,606 | A | | 11/2000 | Mendez ....................... 707/201 |
| 6,199,195 | B1 | | 3/2001 | Goodwin et al. ................ 717/1 |
| 6,338,056 | B1 | | 1/2002 | Dessloch et al. ............... 707/2 |
| 6,370,541 | B1 | | 4/2002 | Chou et al. .................. 707/103 |
| 6,519,597 | B1 | | 2/2003 | Cheng et al. ................. 707/10 |
| 6,556,983 | B1 | | 4/2003 | Altschuler et al. ............ 706/55 |
| 6,564,205 | B2 | * | 5/2003 | Iwata et al. ..................... 707/2 |
| 6,578,046 | B2 | | 6/2003 | Chang et al. ................ 707/103 |
| 6,697,794 | B1 | | 2/2004 | Milby |
| 6,708,221 | B1 | | 3/2004 | Mendez et al. .............. 709/248 |
| 6,941,316 | B2 | * | 9/2005 | Venkatesh et al. ........... 707/101 |
| 2002/0091702 | A1 | | 7/2002 | Mullins ....................... 707/100 |
| 2002/0198891 | A1 | | 12/2002 | Li et al. ....................... 707/102 |

FOREIGN PATENT DOCUMENTS

WO     WO 02/075539 A2     9/2002

OTHER PUBLICATIONS

Peter L. Wallis, External Representations of Objects of User-Defined Type, Apr. 1980, ACM, vol. 2, 137-152.*

J. P. Benkard et al., User defined data types in APL2, Jul. 1989, ACM, 23-30.*

Manuel Rodriguez-Martinez et al., MOCHA: a self-extensible database middleware system for distributed data sources, ACM, Jun. 2000, 213-224.*

Canfora et al., A precise method for identifying reusable abstract data types in code, Sep. 19-23, 1994, IEEE, 404-413.*

Andrews, T. et al., "Combining Language and Database Advances in an Object-Oriented Development Environment", *OOPSLA Proceedings*, Oct. 4-8, 1987, 430-440.

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen, (ed)*; North Holland Publishing Company: 1976, 125-147.

Buneman, P. et al., Inheritance and Persistence in Database Programming Languages, *ACM*, 1986, 4-15.

Chien, A.A., "Concurrent Aggregates (CA)—Design amd Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *WEB Techniques*, 1997, 2(9), 55, 58-59.

"Developer's Guide to Apple Data Detectors—For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series*, vol. 3, *Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et al, "TriStarp—An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland*, Prentice Hall, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' 01*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Mazzola Paluska, J. et al., "Footloose: A Case for Physical Eventual Consistency and Selective Conflict Resolution", *Proceedings of the 5th IEEE Workshop on Mobile Computing Systems and Applications*, 2003, 170-179.

Huang, Yun-Wu. Et al., "Lightweight Version Vectors for Pervasive Computing Devices", *IEEE*, 2000, 43-48.

Ramsey, N. et al., "An Algebraic Approach to File Synchronization", *Software Engineering Notes, Association for Computing Machinery*, Sep. 2001, 26(5), 175-185, XP002295139.

Gray, J. et al., "The Dangers of replication and a Solution", *SIGMOD*, 1996, 25(2), 173-182, XP-002146555.

Helal, S. et al., "A Three-tier Architecture for Ubiquitous Data Access", *Computer Systems and Applications ACS/IEEE*, Jun. 2001, 177-180, XP010551207.

Kistler, J.J. et al., "Disconnected Operation in the Coda File System", *ACM Transactions on Computer Systems*, Feb. 1992, 10(1), 3-25, XP000323223.

Kistler, J.J. et al., "Increasing File System Availability through Second-Class Replication", *IEEE*, 1990, 65-69, XP010021244.

"SyncML Sync Protocol", 2000, Version 1.0, 60 pages, http://www.syncml.org/docs/syncml_protocol_v10_20001207.pdf.

Seshadri, P. et al., "SQLServer for Windows Ce-a Database Engine for Mobile and Embedded Platforms", *Data Engineering, Proceedings of the 16th International Conference, IEEE Computer Society*, Mar. 2000, 642-644, XP 010378761.

Berenson, H. "A Critique of ANSI SQL Isolation Levels", *SIGMOD Record*, 1995, 24(2), 10 pages.

Greenwald, R. et al., "Oracle Essentials: Oracle 8 & Oracle 8i", *MultiUser Concurrency*, 1999, Ch. 7, 7 pages, XP-002312028.

Plattner, C. et al., "Ganymed: Scalable Replication for Transactional Web Applications", *IFIP International federation for Information Processing*, 2004, 155-174, XP-002370197.

Shapiro, M. et al., "Managing Databases with Binary Large Objects", *IEEE*, 1999, 185-193, XP-000922048.

In the United States Patent and Trademark Office, Non-Final Office Action, in re:. U.S. Appl. No. 10/775,282, filed Feb. 10, 2004, Dated Oct. 22, 2004, 25 pages.

In the United States Patent and Trademark Office, Notice of Allowance and Fee(s) Due, in re:. U.S. Appl. No. 10/775,282, filed Feb. 10, 2004, Dated Oct. 22, 2004, 14 pages.

* cited by examiner

```
/* create the Address type, with no
supertype */
create type Address external name
MyTypes::Address /*create the USAddress subtype under it */
create type USAddress subtype under Address
external name MyTypes::USAddress /*variable substitutability*/
declare @usaddr USAddress, @addr Address /* create a value of the USAddress type and
assign it to a variable of type USAddress
*/
set @usaddr = convert(USAddress, 'state=WA;
city=Redmond; street=1234 NE 1st street;
zip=98052'

/* assign the subtype to a variable of the
basetype*/
set @addr = @usaddr
/* convert the value in the variable of the
basetype to the subtype and assign it*/
set @usaddr = convert(USAddress, @addr)

/*column substitutability*/
insert into Addresses (addrcol)
VALUES(@addr)
insert into Addresses (addrcol) VALUES
(@usaddr)
```

FIG. 5

| Property Name | Description |
|---|---|
| Format | The persistence format. |
| MaxByteSize | The maximum size in bytes. |
| IsByteOrdered | Is the binary order of the persisted form the same as the semantic order for values of the type? |
| IsFixedSize | Are all values of the same size? |

FIG. 4

```
/*result set substitutability, some of the address values are of type Address,
others are of type USAddress*/
select addrcol::ToString() from Addresses /* there are now two rows in the Addresses table, one of
 * type Address, and another of type USAddress. Here is the output
 * from the values in the two rows, the first is for the value of
 * type Address, the second is for the value of type USAddress.
 * This example is intended to illustrate that the result set is
 * also substitutable.
 */
--output:
[from addr type] 1234 NW 1st Ave Redmond

[from usaddr type] 1234 NW 1st Ave Redmond state WA zip 98052
```

FIG. 6

| Name | Behavior on error | Semantics |
|---|---|---|
| CONVERT | Raise Error | New Value |
| CAST | Raise Error | New Value |
| TREAT | NULL | In Place |

FIG. 7

| Name | Description | Allowable values |
|---|---|---|
| IsMutator | Controls if method can be used in update context | S |
| OnNullCall | Call method if arguments are null | S |
| InvokeIfReceiverIsNull | Invoke method if receiver is null | S |
| IsDeterministic | Same input returns same output | S, N |
| IsPrecise | Does floating point calculations | S, N |
| DataAccess | Does data access | S |
| SystemDataAccess | Does metadata access | S |
| SqlFacet on return value or parameter | Specifies sql signature of return type or parameter | S (*) all properties on the facet should be the same. |

FIG. 8

SYSTEMS AND METHODS FOR SUPPORTING INHERITANCE FOR USER-DEFINED TYPES

CROSS-REFERENCE

This application is a continuation-in-part of U.S. patent application Ser. No. 10/775,282, filed on Feb. 10, 2004, now U.S. Pat. No. 6,976,029 entitled "SYSTEM AND METHOD FOR PROVIDING USER DEFINED TYPES IN A DATABASE SYSTEM," the contents of which are hereby incorporated herein by reference.

This application is related by subject matter to the inventions disclosed in the following commonly assigned applications, the contents of which are hereby incorporated into this present application in their entirety: U.S. patent application Ser. No. 10/647,058, filed on Aug. 21, 2003, entitled "SYSTEMS AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION"; U.S. patent application Ser. No. 10/646,941, filed on Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed on Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed on Aug. 21, 2003, entitled "SYSTEMS AND METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/646,645, filed on Aug. 21, 2003, entitled "SYSTEMS AND METHOD FOR REPRESENTING RELATIONSHIPS BETWEEN UNITS OF INFORMATION MANAGEABLE BY A HARDWARE/SOFTWARE INTERFACE SYSTEM"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM"; U.S. patent application Ser. No. 10/646,646, filed on Aug. 21, 2003, entitled "STORAGE PLATFORM FOR ORGANIZING, SEARCHING, AND SHARING DATA"; U.S. patent application Ser. No. 10/646,580, filed on Aug. 21, 2003, entitled "SYSTEMS AND METHODS FOR DATA MODELING IN AN ITEM-BASED STORAGE PLATFORM."

TECHNICAL FIELD

The present invention relates to data storage in a computer system and, more particularly, to systems and methods for providing inheritance to user-defined types (UDTs) in a database system where UDTs are an extensibility mechanism employed in connection with relational database engines and file systems to extend a scalar type system(s) of a data store by registering managed types that implement a specific contract.

BACKGROUND

MICROSOFT SQL SERVER is a comprehensive database management platform that provides extensive management and development tools, a powerful extraction, transformation, and loading (ETL) tool, business intelligence and analysis services, and other capabilities. Among other improvements, the MICROSOFT WINDOWS NET Framework Common Language Runtime (CLR) was recently integrated into the SQL SERVER database.

The CLR is the heart of the MICROSOFT .NET Framework, and provides the execution environment for all .NET code. Thus, code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a .NET routine.

In previous versions of SQL SERVER, database programmers were limited to using Transact-SQL when writing code on the server side. Transact-SQL is an extension of the Structured Query Language ("SQL") as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at structural data access and management, it is not a full-fledged programming language as are VISUAL BASIC NET and C#. For example, Transact-SQL does not support arrays, collections, for each loops, bit shifting or classes.

With the CLR integrated into the SQL SERVER database, database developers have been able to perform tasks that were impossible or difficult to achieve with Transact-SQL alone. Both VISUAL BASIC .NET and C# are modern programming languages offering full support for arrays, structured exception handling, and collections. Developers can leverage CLR integration to write code that has more complex logic and is more suited for computation tasks using languages such as VISUAL BASIC .NET and C#. These programming languages offer object-oriented capabilities such as encapsulation, inheritance and polymorphism. Related code can be easily organized into classes and namespaces.

Managed code is better suited than Transact-SQL for number crunching and complicated execution logic, and features extensive support for many complex tasks, including string handling and regular expressions. With the functionality found in the .NET Framework Base Class Library (BCL), database developers have access to thousands of pre-built classes and routines which can be easily accessed from any stored procedure, trigger or user-defined function.

Another benefit of managed code is type safety. Before managed code is executed, the CLR verifies that the code is safe. This process is known as "verification." During verification, the CLR performs several checks to ensure that the code is safe to run. For example, the code is checked to ensure that no memory is read that has not be been written to. The CLR will also prevent buffer overflows.

When writing managed code, the deployment unit is called an assembly. An assembly is packaged as a dynamic link library (DLL). Managed DLL assemblies can be loaded into and hosted by SQL SERVER. The CREATE ASSEMBLY statement is used to register an assembly in the server. Here is an example:

CREATE ASSEMBLY YukonCLR
FROM 'C:\MyDBApp\YukonCLR.dll'

In this example, the FROM clause specifies the pathname of the assembly to load.

SQL SERVER has traditionally supported "built-in" scalar types such as integer, floating point number, date, time, and character string. These built-in types also come with a set of built-in operations such as +, −, *, / as well as built-in functions over these types. These types, operations, and functions are "built-in" in the sense that they are implemented and packaged by the product and users cannot define their own types.

It is desirable for a database system, such as SQL SERVER, to allow users to extend the type system of the database system such that users could create new types that act as scalar types in the database system but which contain more complex structure and behavior—for example, to create a "Point" type consisting of X and Y coordinates. In this regard, the SQL standard and some database management system (DBMS) products have used the term "user-defined type" to describe several forms of type extensibility. For example, the SQL-99 standard describes a "distinct type," which is a type that can be defined by a user to have an internal representation that is a value of an existing SQL built-in data type. A distinct type may optionally share comparison and arithmetic operators, type conversions, and aggregate (column) functions (e.g., max, min, average) with an existing scalar type. The distinct type may allow constraints to be defined on its values. In addition, a distinct type may expose behaviors beyond those of an existing scalar type by defining new functions specific to the distinct type via user-defined functions. With respect to type checking, the distinct type and existing scalar types are considered to be different types.

The main advantage of distinct types is ease of definition. If the internal representation of the new type has a single data member that can be described with an existing built-in type and the built-in type already implements most of the behaviors required on the new type, then distinct types are an attractive alternative. The user does not have to worry about implementing the behaviors required to manage the on-disk storage of the type, constructors, comparison operators (used for ordering and indexing), arithmetic operators, and type conversion (casting) operators. The user only needs to choose what functionality of the underlying built-in type needs to be exposed on the distinct type and optionally add constraints on values or additional functions on the new type. Another advantage of distinct types is that all of the query processing available for built-in types, such as computation of histograms, can be readily used on columns of distinct types. A disadvantage of distinct types, however, is that they can not easily be used to create more complex types.

The SQL-99 standard also described a "structured type," which is a type that can be defined by user and that has an internal representation that is a collection of data members, each of which may be of a different SQL built-in or user-defined type. This is similar to the notion of a struct in C and C++. SQL-99 describes a style for defining structured types by which a user only needs to define the type in terms of its internal structure. The system automatically generates accessor and mutator functions on its data members, constructor, and functions to manage the on-disk representation of instances of the type.

The main advantages of structured types as defined in SQL are (a) ease of definition of basic behaviors of the type, and (b) the flexibility to define more complex types. However, a significant disadvantage of structure types is the complexity of definition of type-specific methods, which are usually defined via external functions written in a general-purpose programming language like C or C++. In order to define a structured type fully, the definer of the type needs to straddle a line between SQL and some other programming language.

While the distinct type and structured type features of SQL 99 offer some advantages to users in terms of enabling them to extend the existing scalar type system of a SQL database, there has been a need for improved systems and methods for enabling a user to extend the scalar type system of a database system through user-defined types that act as scalar types but that contain more complex structure and behavior.

The invention disclosed in the UDT Patent Application is directed to a system and method that allows a user to extend the scalar type system of a database system by creating user-defined types that act as scalar types but that contain more complex structure and behavior. According to that invention, a user writes program code in a high-level programming language that implements a class that defines the structure of a user-defined type and methods that can be invoked on instances of the user-defined type. As used therein (and herein), the term "structure," when referring to a user-defined type, encompasses the set of fields or properties that implement the type. The type of each field in the UDT Patent Application could be a scalar SQL type or any previously defined user-defined type. The class defining a user-defined type is then compiled and registered with the database system. Specifically, a CLR class defining a user-defined type may be compiled into an assembly which is then registered with the database system via a CREATE ASSEMBLY data definition statement. After the assembly is registered, a user can register the class within the assembly that defines the user-defined type using a CREATE TYPE data definition statement.

For the invention of the UDT Patent Application, the database system enforces a specific contract that the class must implement to enable the user-defined type to act as a scalar in the SQL type system. The term "contract," as used therein (and herein), refers to a technique that is used at runtime in object-oriented programming environments to check that code to be executed satisfies certain pre-conditions or requirements to ensure that it will execute properly. According to that invention, the contract against which a class that defines a user-defined type is compared comprises several requirements. First, the class must specify one of a plurality of different formats for persisting instances of the user-defined type in a database store. Second, the class must be capable of returning a null value for the user-defined type. Third, the class must provide a method for converting the user-defined type to and from another type, such as a string type. Once these requirements are satisfied, the database system enables instances of the user-defined type to be created. In one embodiment of that application, the user-defined type can be instantiated as a column value in a table, a variable, a parameter of a routine, or a return value of a routine. The database system stores metadata about the class defining the user-defined type for subsequent use in creating instances of the type. In another embodiment of that invention, the verification of the user-defined type contract is performed using the metadata describing the class that defines the type.

The plurality of different formats for persisting instances of the user-defined type comprises a first format in which an instance of the user-defined type is automatically serialized in accordance with a native format of the database system, and a second format in which an instance of the user-defined type is serialized in a manner defined by the user authored class. Additionally, when the invention of the UDT Patent Application is embodied within MICROSOFT SQL SERVER, in which the MICROSOFT .NET CLR is integrated, a third format is available in which an instance of the user-defined type is serialized in accordance with a method provided by the MICROSOFT .NET Framework.

For the invention of UDT Patent Application, expressions in the query language of the database system can include one or more references to an instance(s) of a user-defined type, such that evaluation of the expression requires invocation of a method on the instance of the user-defined type. When the database system receives such a query language expression, it translates the expression into a sequence of program code instructions that, when executed, invoke the required method on the instance of the user-defined type. The database system then returns the result of the method invocation as the result of evaluation of the query language expression. In one embodiment, the instance of the user-defined type is deserialized prior to invoking the method on the instance.

Another feature of that invention is the ability to change the value of an instance of a user-defined type through invocation of a mutator method. Specifically, the author of the class that defines the user-defined type includes a mutator method as part of the class. When invoked on an instance of the user-defined type, the mutator method enables a value of the user-defined type to be changed. This process may comprise deserializing the instance of the user-defined type, invoking the mutator method to change the value of the deserialized data of the instance, and then serializing the modified instance of the user-defined type to persist the changes.

According to yet another feature of that invention, the class defining a user-defined type may further contain an attribute that specifies that serialized binary representations of instances of the user-defined type will be binary ordered. This allows binary comparisons to be made on instances of the type and also enables indexing to be performed on instances of the type. Specifically, for instances of a user-defined type that are binary ordered, when a query language expression that requires some comparison of two instances of the type is received by the database system (e.g., >, <, or =), the serialized binary representations of the two instances can be used to evaluate the expression, without deserializing either instance. Additionally, for a user-defined type that is binary ordered, a table in the database store can be created that has a column defined as the user-defined type. An index can then be created on the column. An index can also be created over a query language expression that references the user-defined type. In this case, a computed column is first generated over the expression, and then an index is created over the computed column.

SUMMARY

Various embodiments of the present invention are directed to extending a UDT framework to support inheritance. Inheritance is one of the key tenets of object oriented programming and is a basic building block for most modern typesystems (such as the CLR typesystem or the XSD typesystem). With this extension, the object data modeling capabilities of the store are greatly improved. It enables a natural mapping from a common language runtime (CLR) typesystem to a database typesystem without the need for cumbersome and slow object to relational mapping technologies. Supporting concepts related to inheritance in the query language greatly simplify the SQL programming model for inheritance.

While inheritance for user-defined types has been implemented in other database products, various embodiments of the present invention are directed to UDT inheritance solutions that possess one or more of the following capabilities not present in the existing art:

Seamless integration with the CLR typesystem. Several embodiments of the present invention are directed to UDT inheritance system and methods where the basic UDT contract is specified as a set of required custom attributes and interfaces on the managed type, and wherein inheritance extends this same concept and uses the managed type definition to drive the specification of inheritance to the SQL typesystem. This solution enables the developer to author inherited types in any CLS-compliant programming language of their choice, including but not limited to C#, C++ and VB.NET.

Full support for substitutability. For several embodiments of the present invention, if a site (variable, parameter, column definition, etc.) is declared to be of a particular UDT, a value of any of the subtypes of that UDT can be stored in that site. This notion of substitutability extends to all uses of the type including casting, conversion, assignment, and method invocation, as well as in the way result sets are processed by the client application.

Deep integration with the indexing and query subsystems. For numerous embodiments of the present invention, inheritance adds the notion of the exact runtime type of a value that can be different from the declared type. For example, SQL Server supports the creation of indexes over this kind of information, and also uses the index in predicates based on the type of the value. Inheritance would also add the notion of virtual behaviors that can be redefined (overridden) in subtypes, and this notion may be folded into the computation of indexability of a particular UDT function and may be verified at type creation time.

Queryable metadadata and catalog services.

For various embodiments of the present invention, the relationship between a type and its super-type is recorded in metadata at type creation time and is available through queryable catalog views. This lets applications compose queries to determine the substitutable extent of a particular type.

In this regard, one embodiment of the present invention is directed to a database with an extensible type system for at least one user-defined type that comprises information for describing its structure as well as information for describing an inheritance relationship between itself and another user-defined type (either a subtype or a supertype/base type). For certain embodiments, the user-defined type is defined in something other than Sequential Query Language (SQL) statement such as, for example, a Common Language Runtime (CLR) statement, a statement in C, C++, and C# ("C-sharp"), and/or a visual basic statement. In any event, several embodiments are further directed to a system wherein the database is aware of the inheritance relationship between two user-defined types (one as the subtype and the other as the supertype/base type).

For certain embodiments, the database is made aware of said inheritance relationship between the two user-defined types by an explicit registration of the user-defined types with said database. In this regard, one overarching method of the invention for several embodiments comprises: (a) compiling a type into an assembly; (b) registering said assembly with said database; (c) registering said type of said assembly with said database; and (d) using said type.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 is a table illustrating a non-exhaustive list of properties for SqlUserDefinedType;

FIG. 5 is pseudo-code illustrating that, if Address is a type, and if USAddress is a subtype of address, then Addresses may be a table with a column addrcol of type Address.

FIG. 6 is pseudo-code illustrating a client/server deserializer that uses the exact type of the value being deserialized to determine the CLR type that it should deserialize into;

FIG. 7 is a table illustrating the behaviors and semantics for the CONVERT, CAST, and TREAT commands; and FIG. 8 is a table illustrating the routine properties the UDT methods may comprise.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the embodiment described below, the foregoing features of the present invention are described as implemented in the MICROSOFT SQL SERVER database system. As mentioned above, SQL SERVER incorporates the MICROSOFT .NET Common Language Runtime (CLR) to enable managed code to be written and executed to operate on the data store of a SQL SERVER database. While the embodiment described below operates in this context, it is understood that the present invention is by no means limited to implementation in the SQL SERVER product. Rather, the present invention can be implemented in any database system that supports the execution of object-oriented programming code to operate on a database store, such as object oriented database systems and relational database systems with object relational extensions. Accordingly, it is understood that the present invention is not limited to the particular embodiment described below, but is intended to cover all modifications that are within the spirit and scope of the invention as defined by the appended claims.

Computer Environment

Figure 1:
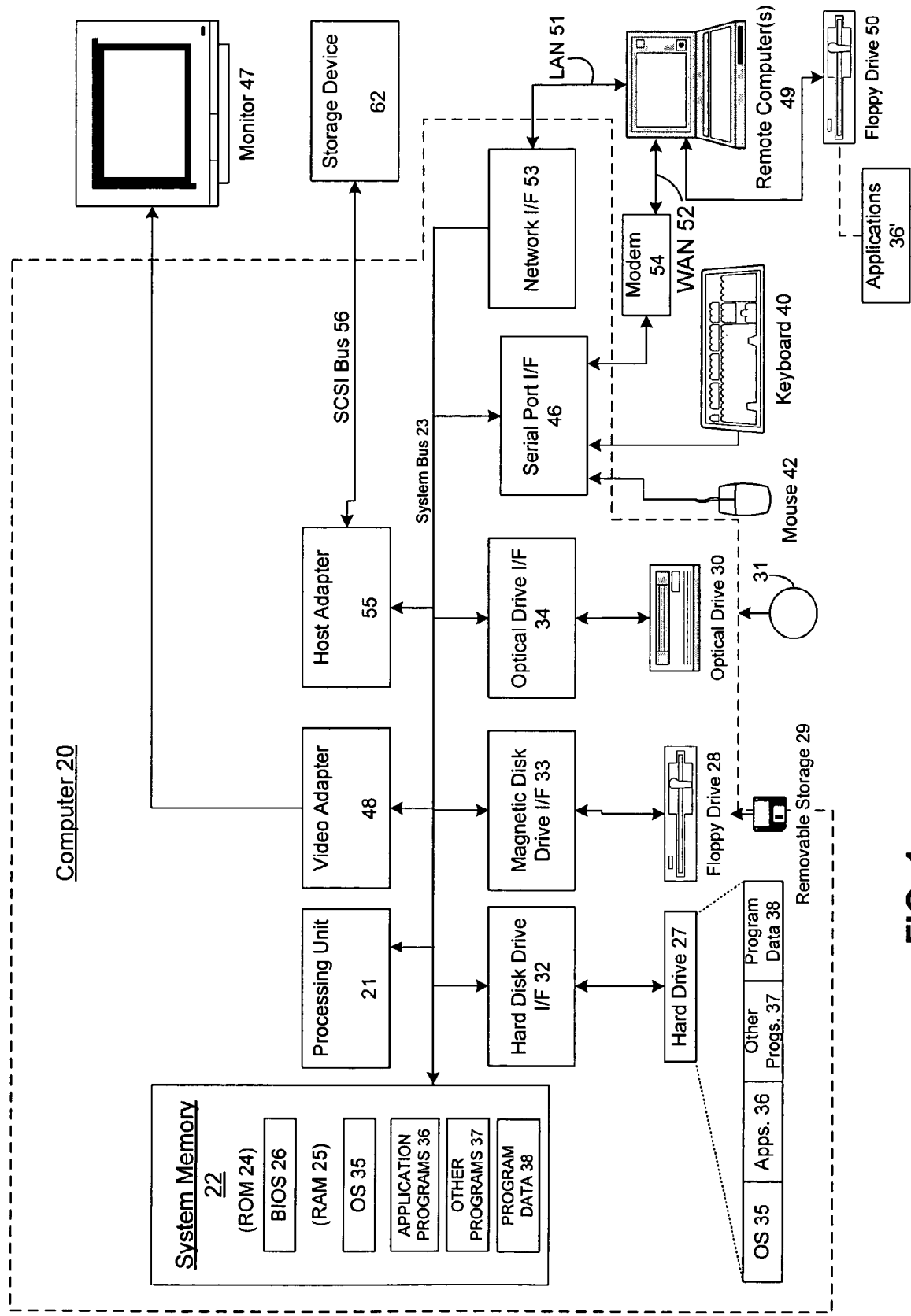
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Network Environment

Figure 2:
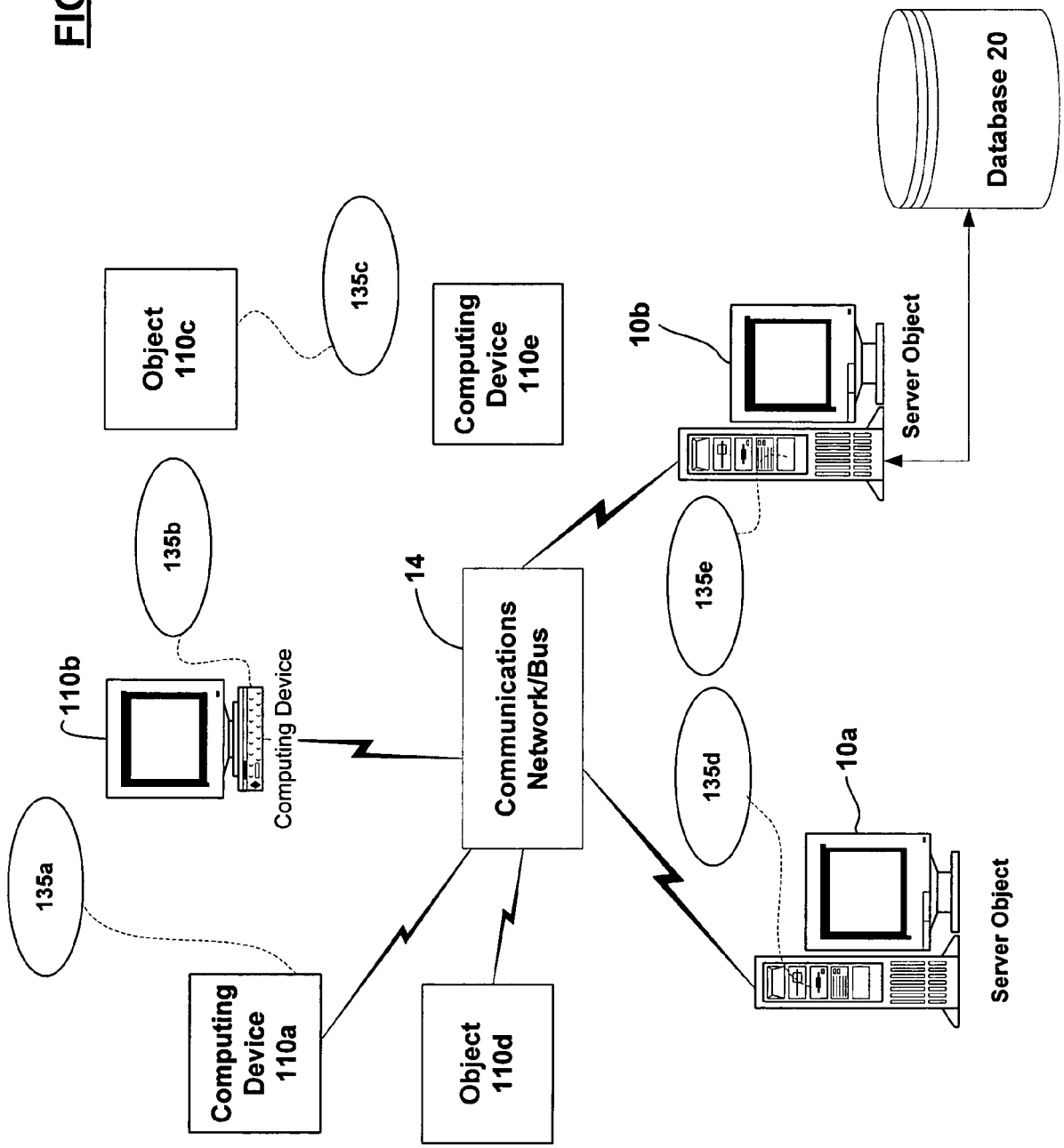
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 2, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the user-defined type techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other.

The network address can be referred to as a URL address. Communication can be provided over any available communications medium.

Thus, FIG. 2 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to create user-defined types in a database store.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

UDTs and Managed Code

Figure 3:
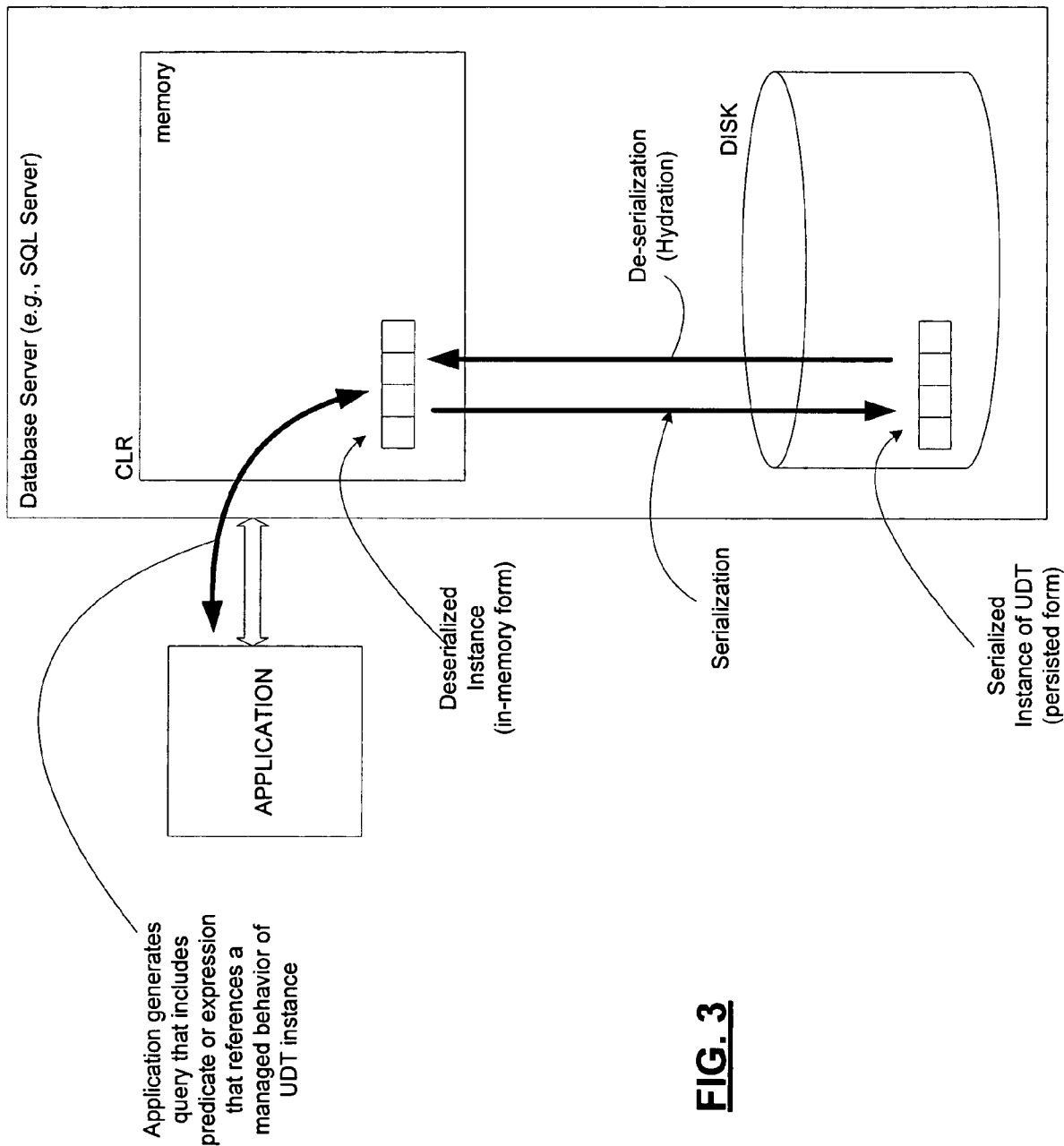
FIG. 3 is a block diagram illustrating the serialization and deserialization of an instance of a user defined type that has been instantiated in managed code.

FIG. 3 is a block diagram illustrating the serialization and deserialization of an instance of a user defined type. As shown, an instance of a user-defined type is persisted on disk through serialization of the object representing the instance in memory. When an application generates a query that includes a predicate or expression that references a method of an instance of a UDT, the persisted form of the instance is deserialized (a process also referred to as "hydration") and the CLR allocates memory for the full object in order to receive its stored values. The CLR then invokes the appropriate method on the object that implements the behavior desired by the application or user.

UDT Inheritance

As used herein, the following terms shall have the meanings indicated:

Base Type: the type that a given type inherits from, also called as supertype, superclass, or proper ancestor in various inheritance models.

Sub Type: a type that has the current type as its base type, either directly, or through another sub type.

Site: Any context in the programming language which has an associated type definition. Examples include variable declarations, parameter definitions, column definitions, etc.

Declared Type: the "compile time" type of a site, such the type of a column in a table, or a function parameter.

Exact Type: the "runtime" type of a particular value. In a strongly typed system, the exact type has to be of the declared type, or be a sub type of the declared type.

Substitutability: the property of a site where a value of the subtype can be "substituted" for a value of the basetype. For example, parameter substitutability implies, if a function is declared to take a parameter of a particular type, it should be possible to pass in a value of a subtype to it.

For various embodiments of the present invention, UDTs are managed types implemented in an assembly registered with SQL Server. UDTs can be used in most contexts where a native type can be used, including table definitions variables and parameters. The methods, properties, and fields defined in the UDT that conform to the UDT contract can be invoked from T-SQL.

For several embodiments, UDTs are assumed to be simple scalars with behavior. This assumption is reflected in the simple programming model and the serialization layouts supported by UDTs. For example, a file system may use the UDT abstraction to create "structured types" that are not simple scalars but, instead, could be types with a complex structure and behavior.

The following pseudo-code describes the creation of a subtype for several embodiments of the present invention:

CREATE TYPE [type-schema-name.]subtype-name
UNDER [type-schema-name.]base-type-name
EXTERNAL NAME assembly-name:clr-type-name To establish an inheritance contract, and for several embodiments of the present invention, the UDT author has to annotate the base type in the type hierarchy with, for example, the SqlUserDefinedType custom attribute, and properties on this attribute specify invariants that apply to the entire type family (a type and all of its subtypes). A non-exhaustive list of properties for SqlUserDefinedType are illustrated in FIG. 4. Then, at type registration time, the user must add the "UNDER" clause to indicate the base SQL type under which a particular type must be registered, for example:

/* create the Address type, with no supertype */create type Address
external name MyTypes::Address
/*create the USAddress subtype under it */create type USAddress under Address
external name MyTypes::USAddress For several embodiments of the present invention, the base-type-name has to be registered as a valid UDT in the specified schema. In addition, the CLR type has to be a direct subtype of the CLR type that the base-type-name is defined over. The subtype should not define the SqlUserDefinedTypeAttribute, it should inherit the attribute from its parent. Furthermore, the base type must not be binary ordered. Likewise, all the out of band routine properties (SqlMethodAttribute annotations) that are specified in the base type must be consistent with the subtype definition—specifically, all indexable methods defined in the base type must continue to be indexable for routines that are overridden in the subtype—and this information might be gathered from the base type and verified by enumerating over all the routines in the subtype as part of the CREATE TYPE checks.

For various embodiments of the present invention, the framework for UDT inheritance may be described in terms of the external surface area of the feature and its underlying implementation. In addition, values of the subtype is considered substitutable in column definitions; local variable and parameter declarations in batches, stored procedures, and functions; and query result sets where the result column can contain values that are of the declared type of the column or any of its subtypes.

For several embodiments of the present invention, allowing an instance of a subtype to be stored in a column that is declared to be of the supertype has the following implications: (a) the serialization format should be the same for the base type and the subtype; and (b) the MaxByteSize value for the parent has to be big enough to allow storing an instance of the subtype. If there is insufficient space, at runtime, attempts to store a value of the subtype in a column of the base type will fail, and so to prevent this error the base type can be defined with unlimited.

For various embodiments of the present invention, all assignments may preserve the exact type of the value, and assigning a value of a subtype to a variable of a basetype will always succeed while assigning a value with a declared type of the basetype to a variable of the subtype will require an explicit conversion that will succeed only if the exact type of the value is assignable to the target type. For example, if Address is a type, and if USAddress is a subtype of address, then Addresses may be a table with a column addrcol of type Address as illustrated in FIG. 5.

In implementation for several embodiments of the present invention, information about the inheritance relationship between two types is a first class part of the scalar typesystem of the database, and this information is used to determine assignability and conversion between values. In certain embodiments, two new operators called IS OF and TREAT are introduced into the scalar typesystem, and these operators may be used to model type predicates and in-place conversion during scalar expression evaluation. To enable proper semantic reasoning and combining common operations (such as an IS OF predicate and a TREAT in the project list of a query), the TREAT operator is transformed during query compilation. As a further optimization, the IS OF operator may be rewritten in terms of the hierarchical_type_id to take advantage of any type specific indexes that may be available. When a UDT expression is encountered, the UDT expression compilation process is modified to account for the nature of the dispatch (virtual vs. static), and to disambiguate methods based on the full signature of the method, including the parameter types. This information is passed in from the outer compilation process and is used in method location. Once the method is found, the appropriate IL instruction is used to invoke the static dispatch or virtual method. Then at runtime, the UDT deserialization code uses the exact type of the value to create the object of the correct type and populate it with the persisted state. This object is pushed onto the execution stack and the method is invoked.

For several embodiments, a client/server deserializer also uses the exact type of the value being deserialized to determine the CLR type that it should deserialize into. If the client has not encountered the type before, it makes an out of band request on a cloned connection to download the metadata about the CLR type on demand and uses this information to locate the CLR type. (See FIG. 6.)

For several embodiments, it may be given that all methods, properties, and fields invoked from T-SQL are resolved dynamically using the exact type of the instance and not the declared type of the call site. Moreover, all inherited methods, properties, and fields that are defined in the supertype and can be callable directly from T-SQL will be allowed. Thus there will be no difference in the syntax for invoking declared methods versus inherited methods.

For several embodiments of the present invention, the method for locating the target invocation can be characterized in pseudo-code as follows: If D is the declared type of the call site, and M is the method name, and P1 . . . Pn are the parameters to the method with T1 . . . Tn being the types of the parameters, then if the query is "select<site of type D>.M (P1 . . . Pn)", the invocation method would comprise:

```
startType = D;
Method targetMethod = null;
while (true)
{
    If (startType == null)
        throw new NoSuchMethodException(D, M);
    Method[ ] methods = GetMethods(startType, M, {T1...Tn})
    if (methods.Length == 0)
        startType = startType.BaseType;
    else if (methods.Length > 1)
        throw new OverloadedMethodException(M);
    else
    {
    targetMethod = methods[0];
    break;
    }
}
```

In regard to the method invocation used for several embodiments of the present invention, the method name matching uses binary collation. In addition, the parameter type check ensures that the CLR type for each parameter is implicitly convertible from a SQL parameter type. Moreover, method overloading is not allowed if there are two suitable methods in the same type, but it is allowed if the two methods take different numbers of parameters or they are defined in different types in the hierarchy. Similarly, if a method or a property returns an instance of a CLR subtype that is not registered with SQL, the system will raise an error at runtime. Furthermore, the actual dispatch instruction used depends on the method that was resolved—that is, if the method found is defined as a virtual or an overridden method, virtual dispatch is used, else, static dispatch is used.

For various embodiments of the present invention, conversions from a type to its supertype (upcast) will always succeed, while onversions from a type to its subtype (downcast) will succeed if the value is of the correct type and the coversion will fail if it is not of the correct type where the exact failure mode depends on the conversion operator used.

For such embodiments, there are three conversion operators: CONVERT, CAST, and TREAT as follows:

CONVERT([schema.]type, target_type)→value of [schema.]type or error if the conversion fails.

CAST(value as [schema.] target_type)→value of [schema.]type or error if the convert fails.

TREAT(value as [schema.]target_type)→value of [schema.]type or NULL if the conversion fails.

For these embodiments, CAST and CONVERT may be existing operators that have been modified to understand inheritance and substitutability. TREAT, on the other hand, is SQL99 conformant syntax (§ 6.25 of the SQL standard) and is intended for use in downcasting or narrowing scenarios when an expression of a supertype is to be treated as an expression of one of its subtypes (the standard calls this subtype treatment). This operator is valid in two contexts: (a)

to access the properties of that are defined in a subtype; and (b) to update properties that are defined in a subtype. At compile time, if the declared type of value is not a supertype of the target_type, an error will be reported and TREAT will fail. For example:

select TREAT(person as Employee).Salary from T
    where person is of (Employee)
    update T
    set TREAT(person as Employee).Salary=10000
    where ID=x On the other hand, the standard does not support invoking mutator methods on a NULL instance, and SQL Server will also enforce this restriction for the results of the TREAT operator. If TREAT produces a NULL value, the system will raise an error on attempts to update the NULL value. In other words, logically TREAT (value as type_x) may be transformed to IF (value IS OF type_x) THEN value else NULL for several embodiments of the present invention, as represented by the table illustrated in FIG. 7 which, in general, illustrates the behaviors and semantics for the CONVERT, CAST, and TREAT commands.

For several embodiments, and as part of the UDT extensions, a new property on SqlUserDefinedTypeAttribute and on SqlMethodAttribute may be used to control whether methods on a type should be invoked if the receiver (this) is a null value, though this can be overridden for specific method by setting it to true using a SqlMethodAttribute. For these embodiments, the default value is FALSE. In addition, if the return type of the method is a nullable type, the distinguished null value for the type is returned. If the return type is not nullable, the default clr value for the type is returned. The default value for reference types is null, the default value for value types is the result of calling the default constructor for the type.

For various embodiments, all null values in the system are typed. However, since type predicates as specified in the standard returns unknown if the value is null, there is no way from SQL to determine the specific type of a null value. Hence, these embodiments may treat all null values as being of the declared type of the call site, and not the exact type of the value that was inserted into site. For example, declare @emp Employee
    set @emp=NULL
    insert into Persons values (@emp)
    select pcol from Persons—returns a null value, the type of the instance is Person For various embodiments, type predicates support both (a) the return all the instances of a type and all of its subtypes in a column, as well as (b) the return all the instances of a specific type in a column (as set forth in § 8.14 of the SQL99 standard). Consider the following:

udtColumnOrValue IS [NOT] OF (type-specifier)
    type-specifier::=[ONLY] TYPE [, type-specifier]

If udtColumnOrValue is null, the result is unknown, otherwise the predicate returns a boolean result.

Type predicates can be used in all scalar contexts where an expression that produces a Boolean is permitted such as, for example, instances of a type only:

select convert(USAddress, addrcol) as USAddrCol from Addresses
    where addrcol is of (only USAddress);

This is in contrast to instances of a type and all of its subtypes:

select convert(USAddress, addrcol) as USAddrCol from Addresses
    where addrcol is of (USAddress);

In addition, for several embodiments of the present invention the sys.assembly_types catalog view will have one additional column as follows:

| base_type_id | int | The user_type_id of my basetype. |
|---|---|---|

In addition, and for numerous embodiments of the present invention, when a virtual method is overridden in a subtype, the overridden implementation has to be substitutable with respect to the routine properties specified in the base method. This matrix is checked at type registration time and an error is generated if an invalid combination is detected. The guiding principles here are that the subtype implementation should not break indexability of base method. Thus, if the base method definition is indexable, the overridden implementation should also be indexable. Moreover, subtype implementation should not invalidate expression compiled for base method definition (null receiver and arguments, sqlfacet, data access, mutator method invocation). On the other hand, subtype implementation can add behaviors that don't conflict with base but need a cast or treat to be activated (indexability). If "N" denotes "new in subtype," that is, where the subtype can set a property to true even if base type has value set to false or not defined, and if "S" denotes "same as base definition," that is, where the definition in the subtype is the same as in the base type, then the UDT methods may comprise the routine properties illustrated in FIG. 8.

In addition to the foregoing, and for several embodiments of the present invention, every UDT value has to carry its specific type_id around, and this should never change once a UDT is created. Since there is no support for binary ordering with UDT inheritance, this approach does not affect binary comparisons for the type (as all the instances that will be binary compared will have the same type_id). Moreover, the DROP type should check that there are no columns defined of any of the supertypes that contain a value of the subtype (and thus the DROP type could be expensive as a result). Similarly, the add subtype will invalidate existing comp plans that reference the supertype for every type in the chain.

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed is:

1. A system comprising:
   at least one processor;
   computing memory communicatively coupled to the processor, the computing memory operable to store and retrieve at least one user-defined type defined by a class created by managed code, the class comprising information for describing a structure of said at least one user-defined type, and information for describing an inheritance relationship between said at least one user-defined type and a second user-defined type, wherein the inheritance relationship of the second user-defined type to the at least one user-defined type is at least one of a subtype or a supertype of said at least one user-defined type;
   a database stored in said computing memory with an extensible type system, the class created by the managed code that defines the at least one user-defined type is compiled into an assembly that is explicitly registered with the database such that the user-defined type acts as a scalar type within a structured query language (SQL) language type system, the explicit registration indicating the inheritance relationship between said at least one user-defined type and said second user-defined type.

2. The system of claim 1 wherein said second user-defined type is the subtype of said at least one user-defined type.

3. The system of claim 1 wherein said second user-defined type is the supertype of said at least one user-defined type.

4. The system of claim 1 wherein said at least one user-defined type is defined by a Common Language Runtime (CLR) statement.

5. The system of claim 1 wherein said managed code is at least one of, or derived from at least one of, the following group of programming languages: visual basic, visual C++, C, C++, or C#("C-sharp").

6. The system of claim 1 comprising:
   a subsystem for compiling a type into the assembly;
   a subsystem for registering said assembly with said database;
   a subsystem for registering said type of said assembly with said database; and
   a subsystem for using said type.

7. The system of claim 1, wherein said at least one user-defined type is defined in something other than a Sequential Query Language (SQL) statement.

8. A method implemented at least in part by a computing system for providing, in a database stored in memory, an extensible type system for at least one user-defined type, said method comprising:
   storing a class created by managed code in memory, said class comprising information-for describing a structure of said at least one user-defined type, wherein the class is compiled into an assembly;
   storing information in memory for describing an inheritance relationship between said at least one user-defined type and a second user-defined type in said at least one user-defined type, wherein the inheritance relationship of the second user-defined type to the at least one user-defined type is at least one of a subtype or a supertype of said at least one user-defined type;
   performing an explicit registration of the assembly, with said database stored in memory such that the user-defined type acts as a scalar type within a structured qury language (SQL) language type system, said explicit registration making said database aware of said inheritance relationship between said at least one user-defined type and said second user-defined type.

9. The method of claim 8 further comprising creating said second user-defined type that is the subtype of said at least one user-defined type.

10. The method of claim 8 further comprising creating said at least one user-defined type that is the subtype of said second user-defined type.

11. The method of claim 8 further comprising defining said at least one user-defined type using a Common Language Runtime (CLR) statement.

12. The method of claim 8, wherein said managed code is at least one of, or derived from at least one of, the following group of programming languages: visual basic, visual C++, C, C++, or C#("C-sharp").

13. The method of claim 8 further comprising:
    compiling a type into an assembly;
    registering said assembly with said database;
    registering said type of said assembly with said database; and
    using said type.

14. The method of claim 8, further comprising defining said at least one user-defined type using something other than a Sequential Query Language (SQL) statement.

15. A computer-readable storage medium comprising computer-readable instructions for a database stored in memory with an extensible type system for at least one user-defined type, said instructions comprising instructions for:
    storing a class created by managed code in memory, said class comprising information for describing a structure of said at least one user-defined type, wherein the class is compiled into an assembly;

storing information in memory for describing an inheritance relationship between said at least one user-defined type and a second user-defined type in said at least one user-defined type, wherein the inheritance relationship of the second user-defined type to the at least one user-defined type is at least one of a subtype or a supertype of said at least one user-defined type;

performing an explicit registration of the assembly, with said database stored in memory such that the user-defined type acts as a scalar type within a structured qury language (SQL) language type system, said explicit registration making said database aware of said inheritance relationship between said at least one user-defined type and said second user-defined type.

16. The computer-readable instructions of claim 15 further comprising instructions whereby said second user-defined type is the subtype of said at least one user-defined type.

17. The computer-readable instructions of claim 15 further comprising instructions whereby said second user-defined type is the supertype of said at least one user-defined type.

18. The computer-readable instructions of claim 15 further comprising instructions whereby said at least one user-defined type is defined by a Common Language Runtime (CLR) statement.

19. The computer-readable instructions of claim 15, wherein said managed code is at least one of, or derived from at least one of, the following group of programming languages: visual basic, visual C++, C, C++, or C#("C-sharp").

20. The computer-readable instructions of claim 15 further comprising instructions whereby said database is aware of said inheritance relationship between said at least one user-defined type and said second user-defined type.

21. The computer-readable instructions of claim 15 further comprising instructions for:
compiling a type into the assembly;
registering said assembly with said database;
registering said type of said assembly with said database; and
using said type.

22. The computer-readable instructions of claim 15, further comprising instructions whereby said at least one user-defined type is defined in something other than a Sequential Query Language (SQL) statement.

23. A method implemented at least in part by a computing system for providing, in a database stored in memory, a queryable catalog view of metadata for at least one user-defined type, said method comprising:
storing information in memory for describing a structure of said at least one user-defined type-in said at least one-user-defined type;

storing information in memory for describing an inheritance relationship between said at least one user-defined type and a second user-defined type in said at least one user-defined type, wherein the inheritance relationship of the second user-defined type to the at least one user-defined type is at least one of a subtype or a supertype of said at least one user-defined type; and recording in metadata for the at least one user-defined type the inheritance relationship between the at least one user-defined type and the second user-defined type, wherein the metadata is searchable through queryable catalog views that may be queried; and storing said metadata in memory.

24. A method implemented at least in part by a computing system for searching, in a database storing metadata in memory, for the extent of substitutability for at least one user-defined type, said method comprising:
querying the metadata for a user-defined type to identify at least one user-defined type with information stored describing an inheritance relationship with a second user-defined type;
identifying the at least one user-defined type, wherein the inheritance relationship described is that the second user-defined type is a subtype of the at least one user-defined type;
identifying a property of a site of the at least one user-defined type, wherein the site has an associated type definition and a property where a value of the subtype type can be substituted for a value of the at least one user-defined type;
substituting a value of the second user-defined type for the value of the at least one user-defined type.

25. A method implemented at least in part by a computing system for providing, in a database stored in memory, a queryable catalog view of metadata for at least one user-defined type, said method comprising:
storing information in memory for describing a structure of said at least one user-defined type-in said at least one-user-defined type wherein an inheritance relationship described is that the at least one user-defined type is a supertype, and a second-user-defined type is a subtype of said supertype;
identifying a runtime type of a value of the supertype, wherein the runtime type of the value may be different from a compile time value of the supertype;
creating indexes over the runtime type of the value;
using the index in predicates based on the runtime type of the value.

* * * * *